(12) United States Patent
Richard et al.

(10) Patent No.: US 6,338,255 B1
(45) Date of Patent: Jan. 15, 2002

(54) REFRIGERANT CHARGING DEVICE

(75) Inventors: Robert G. Richard; Randy S. Cool, both of Erie, NY (US)

(73) Assignee: Honeywell International Inc., Morris Township, NJ (US)

( * ) Notice: Subject to any disclaimer, the term of this patent is extended or adjusted under 35 U.S.C. 154(b) by 0 days.

(21) Appl. No.: 09/501,330

(22) Filed: Feb. 9, 2000

(51) Int. Cl.[7] ................................................ F25B 45/00
(52) U.S. Cl. ............................ 62/292; 62/149; 62/77
(58) Field of Search .......................... 62/292, 149, 77, 62/474, 475, 470, 85, 195

(56) References Cited

U.S. PATENT DOCUMENTS

| | | | |
|---|---|---|---|
| 3,302,421 A | 2/1967 | Karnes | 62/77 |
| 3,759,291 A | 9/1973 | Moore et al. | 137/588 |
| 4,285,506 A | 8/1981 | Koser | 62/126 |
| 4,805,416 A | 2/1989 | Manz et al. | 62/292 |
| 4,869,300 A | 9/1989 | Gudenau et al. | 141/59 |
| 5,080,132 A | 1/1992 | Manz et al. | 137/614.04 |
| 5,127,239 A | 7/1992 | Manz et al. | 62/292 |
| 5,172,562 A | 12/1992 | Manz et al. | 62/149 |
| 5,317,903 A * | 6/1994 | McClelland et al. | 62/77 |
| 5,323,808 A * | 6/1994 | Shimizu | 62/292 X |
| 5,349,998 A * | 9/1994 | Gonfiantini | 62/292 X |
| 5,558,124 A | 9/1996 | Randall | 137/597 |
| 5,715,692 A * | 2/1998 | Pappas | 62/292 X |
| 5,722,247 A * | 3/1998 | Albertson et al. | 62/149 |
| 5,758,506 A * | 6/1998 | Hancock et al. | 62/77 |

FOREIGN PATENT DOCUMENTS

| | | | |
|---|---|---|---|
| GB | 1 442 201 | 7/1976 | |
| GB | 2 050 577 A | 7/1981 | F16K/31/363 |

* cited by examiner

*Primary Examiner*—Henry Bennett
*Assistant Examiner*—Chen-Wen Jiang
(74) *Attorney, Agent, or Firm*—Colleen D. Szuch

(57) ABSTRACT

A device for recharging an a/c system with dye containing refrigerant using recovery/recycle/recharging equipment. The device connects to the recovery/recycle/recharging equipment so as to allow the refrigerant/dye mixture to bypass the purification process of such equipment and has a main valve having first and second inlets and an outlet. The first inlet connects to a source of refrigerant/dye mixture, the second inlet connects to the recovery/recycle/recharging equipment and the internal refrigerant tank therein, and the outlet connects to the a/c system to be recharged. The main valve is operable to provide a first fluid path from the first inlet to the outlet while isolating the second inlet, and a second fluid path from the second inlet to the outlet while isolating the first inlet. In operation the device allows the isolation of the recovery/recycle/recharging equipment refrigerant tank while virgin refrigerant with dye is added to the a/c system.

18 Claims, 3 Drawing Sheets

REFRIGERANT CHARGING DEVICE

BACKGROUND OF THE INVENTION

The present invention is directed to equipment used with air conditioning systems for recovering, recycling, and recharging refrigerant, and more particularly to a device that allows the charging of a dye containing refrigerant with such recovery, recycling, and recharging equipment.

Environmental concerns over the release of refrigerants into the atmosphere have led to devices for recovery, purification and storage of used refrigerants from air conditioning (a/c) systems for later reuse. Examples of such devices, referred to herein as Recover/Recycle/Recharge (R/RRR) equipment are discussed in U.S. Pat. Nos. 5,172,562 and 4,805,416. Such devices are well known for use with mobile a/c systems (e.g. automobiles) and may themselves be provided as portable units. These devices recover and purify the refrigerant by use of an internal recycling process, and store the refrigerant in an internal recovery tank. This type equipment can also charge recycled refrigerant back into the air conditioning systems from the internal recovery refrigerant tank.

Another advance to help control the release of refrigerant to the atmosphere is the addition of a dye to the refrigerant to simplify leak detection. One such product is Genetron® 134aUV which is a pre-mixture of refrigerant R-134a, an EPA approved replacement refrigerant for R-12, and a refrigerant soluble ultraviolet dye.

Dye containing refrigerant such as Genetron 134aUV was originally intended to be charged using conventional automotive charging equipment such as charging meters (i.e. weigh scales) and dial-a-charge charging cylinders. These products were not intended to be used as make-up refrigerant for the R/R/R equipment commonly used in the industry. This type R/R/R equipment charges refrigerant from the internal recovery tank to the a/c system using various technologies, e.g., weigh scale technology and dial-a-charge. The internal recovery tank holds a mixture of both the recovered refrigerant as well as the virgin make-up refrigerant. During the charging process, the refrigerant in the internal tank, both the recovered and virgin refrigerants, are exposed to the internal recycling process which removes the UV dye. The end result is that the a/c system is charged with refrigerant absent the UV dye.

Accordingly, one object of the present invention is to provide a device allowing the use of dye containing refrigerant with R/R/R equipment.

Another object is to provide a device that is easy to use with existing R/R/R equipment.

Additional objects, advantages and novel features of the invention will be set forth in part in the description that follows, and in part will become apparent to those of ordinary skill in the art upon review of the following or may be learned by practice of the invention.

SUMMARY OF THE INVENTION

The present invention provides a device that allows virgin refrigerant, e.g., dye containing refrigerant, to be added to an air conditioning system in conjunction with R/R/R equipment. In broad terms, the invention provides a device having a main valve. The main valve has a first inlet for receiving the virgin refrigerant from a source of virgin refrigerant, a second inlet for connection to the recovery system and for receiving refrigerant therefrom, and an outlet for connection to the air conditioning system to deliver refrigerant thereto. The main valve is operable to provide at least two flow paths that are exclusive of each other, a first flow path from said first inlet to said outlet, and a second flow path from said second inlet to said outlet.

A second valve is connected to said first inlet and is configured for connection to the source of virgin refrigerant. The second valve is operable between open and closed positions for controlling the flow of fluid from the source of virgin refrigerant through the second valve to the main valve.

A hose connected to the outlet of the main valve can be used to connect the device to the air conditioning system. Likewise, a hose can be used to connect the device to the R/R/R equipment.

DETAILED DESCRIPTION OF THE DRAWINGS

The invention will be described in detail below with reference to the following drawings.

DETAILED DESCRIPTION

Described below is a preferred embodiment of the present invention which is configured for use with refrigerant recovery, recycling and recharging (R/R/R) equipment as used with mobile a/c systems. Examples of such equipment are disclosed in U.S. Pat. Nos. 5,172,562 and 4,805,416 which are hereby incorporated by reference.

Figure 1:
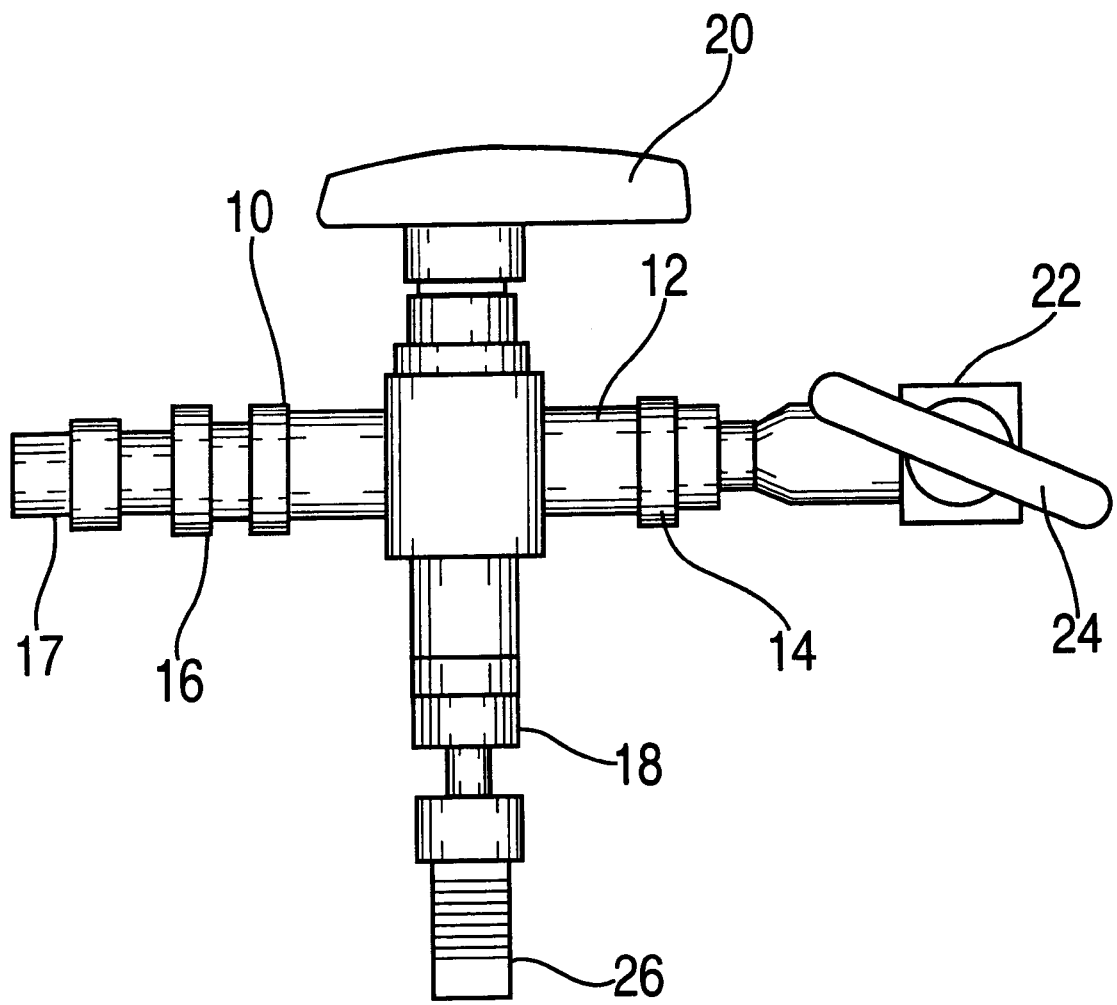
FIG. 1 is a side view of a device in accordance with the present invention.

With reference to FIG. 1, a device 10 for charging refrigerant into an air conditioning system has a main valve 12 having a first inlet 14 for receiving the virgin refrigerant from a source of virgin refrigerant, a second inlet 16 for connection to the R/R/R equipment and for receiving refrigerant therefrom, and an outlet 18 for connection to the air conditioning system to deliver refrigerant thereto. The valve is operable to provide at least two flow paths that are exclusive of each other—a first flow path whereby fluid can pass from the first inlet 14 to the outlet 18 while isolating the inlet 16, and a second flow path from the second inlet 16 to the outlet 18 while isolating the first inlet 14. The valve 12 has a handle 20 for switching between the first and second flow paths. The valve configuration and materials of construction are those suitable for refrigerants such as R-134a.

The first inlet 14 is connected directly to second valve 22 for connection to the virgin R-134a source such as Genetron R-124a UV. "Virgin refrigerant" as used herein means refrigerant not processed through the R/R/R equipment and which is supplied separately from the recovery tank in the R/R/R machine so that any additives, such as dye, are still present. The valve 22 preferably is a standard R-134a can charging valve having a ½" acme thread which can hold a can of refrigerant, a handle 24 for controlling the flow of refrigerant from the can and which can pierce the can to release the refrigerant. The typical 12oz. can thread can be modified to a unique fitting size allowing the device 10 to be used only with particular refrigerant products. While the present embodiment illustrates a second valve 22 non integral with the main valve 12 and which is connected thereto with fittings or other type of connection means, an integral device where the two valves 12, 22 are formed as an integral device and thus integrally connected to one another is contemplated.

The second inlet 16 preferably has a R-134a low side male quick connect fitting 17 which provides easy "quick connection" to the R/R/R equipment low-side service hose.

Figure 2:
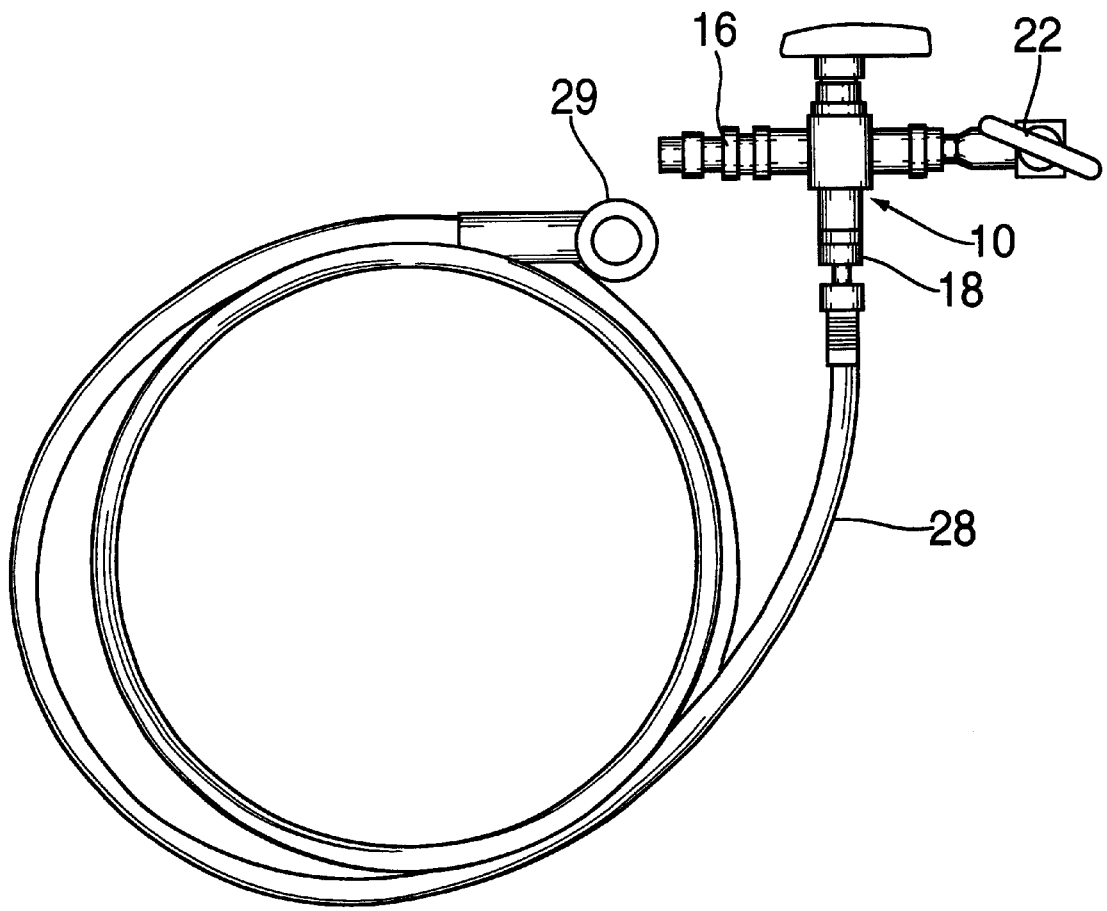
FIG. 2 is a side view of the device of FIG. 1 connected to a hose extension.

The main valve outlet 18 has a standard R-134a ½" acme male thread fitting 26. As shown in FIG. 2, this permits connection of a standard low-side service hose extension 28 which includes an integral shut-off valve 29 for attachment to the a/c system as known in the art.

The device 10 enables an a/c system, such as a mobile a/c system used in a car, to be charged with a combination of dye containing refrigerant and the recycled purified refrigerant from the R/R/R equipment. The device 10 adds the virgin refrigerant to the a/c system external of the R/R/R equipment thereby eliminating the exposure of the dye containing refrigerant to the recycling/purification process which would normally strip the dye from the refrigerant.

Figure 3:
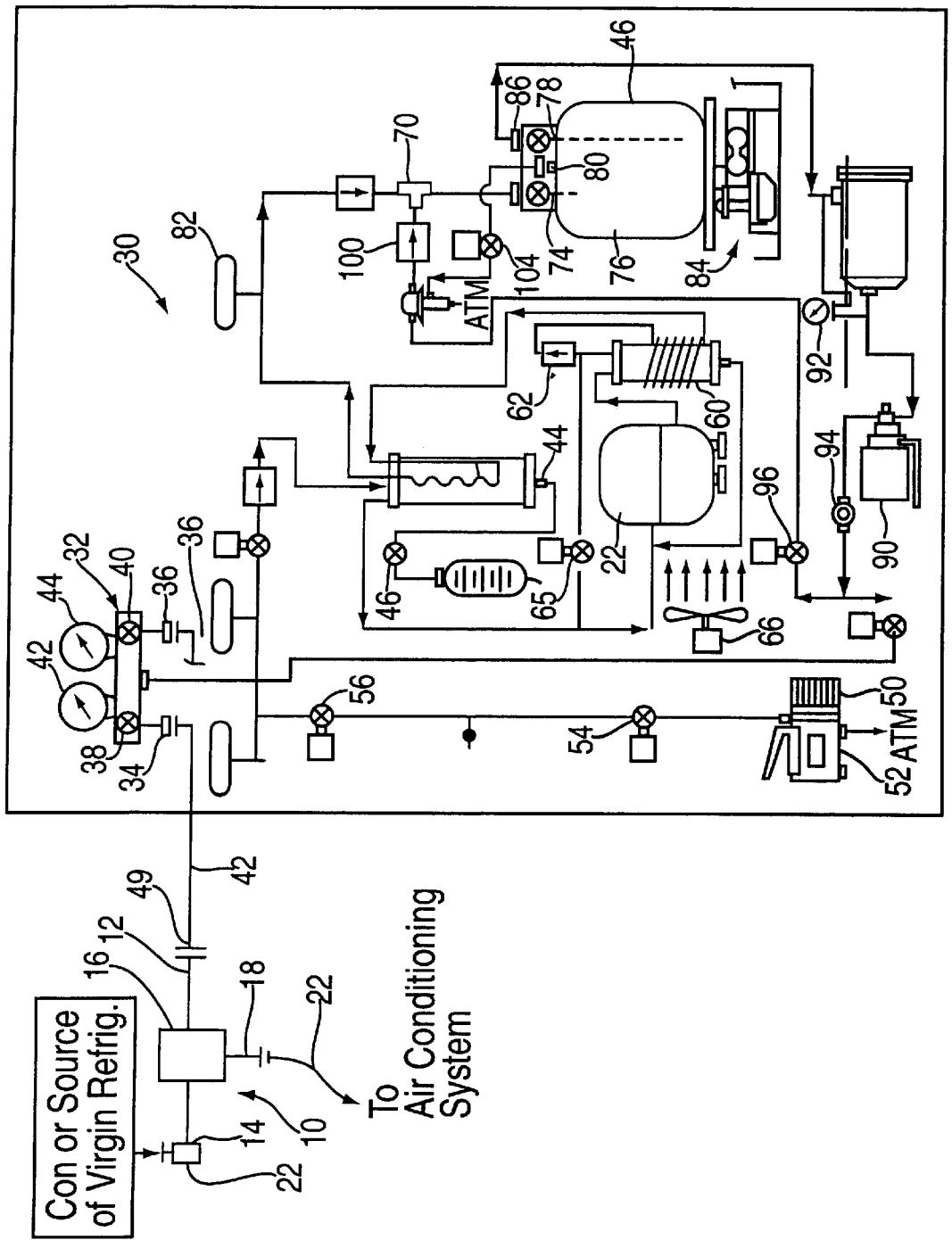
FIG. 3 is a schematic view of a common R/R/R machine in conjunction with the device of FIG. 1.

Use of the device 10 for charging refrigerant is now described with further reference to FIG. 3 which is a schematic of an R/IRR machine 30 as illustrated in US Pat. No. 5,172,562 and which describes a removal and purification means of the machine 30, it being understood that the present invention is not limited to an R/R/R machine of this particular design. The particular components and workings of common R/R/R machines is illustrated in greater detail in U.S. Pat. Nos. 5,172,562 and 4,805,416. A manifold 32 includes connections 34 and 36, typically quick disconnects, for connection to the low-pressure and high-pressure sides of the a/c equipment to be serviced and recharged with refrigerant. The manifold 32 also includes manual valves 38, 40 for controlling the flow through the respective connections 34 and 36, and respective pressure gauges 42, 44. Within the R/R/R machine 30, the manifold 32 is connected to an internal refrigerant recovery tank 46. The R/R/R machine 30 is typically connected to the a/c system through hoses 48 and 50 connected to connections 34 and 36 respectively.

A simple connection of the device 10 to the R/R/R machine 30 can be made with use of one of the hoses that previously connected the R/R/R machine 30 directly to the a/c system. For example, the device 10 (second inlet 16) can be connected to an end 49 of the hose 48. The extension hose 28 then connects the device 10 to the a/c system to complete the connection between the machine 30 and the low side of the a/c system. Thus it is seen that the device 10 with extension hose 28 is simply an extension of the low side service hose 48 and may remain connected to the hose 48 permanently. The valve 12 should initially be in the normal operating position so that refrigerant can flow only from the second inlet 16 to the outlet 18, isolating the first inlet 14.

Once the hoses 28 and 50 are connected to the a/c system, recovery of refrigerant and evacuation of the a/c system is completed using standard R/R/R equipment operating procedures.

For recharging the a/c system, a source of virgin refrigerant 52, such as a 12oz. can of R-134aUV with dye, is connected to the second valve 22. The handle 20 of the main valve 12 is operated to allow flow only from the first inlet 14 the outlet 18 while isolating the second inlet 16. If the source 52 of refrigerant is a can, the can is pierced by the second valve 22 and the valves 22, 12 operated to allow the refrigerant and dye to be drawn into the a/c system. The can of refrigerant preferably should be inverted during the charging operation to facilitate liquid removal from the can and insure addition of the dye. Inversion would not be necessary with use of an internal dip tube such as those typically used with larger jugs of refrigerant.

Once the contents of the can is discharged, the handle 24 of the valve 12 is returned to the "normal" operating position isolating the first inlet 14 and allowing removal of the can. The remaining refrigerant charge to the a/c system is done from the internal recovery tank 46 of the R/R/R machine 30. Once the charge is completed, the hoses 28 and 50 are disconnected from the a/c system which has been charged with an adequate amount of UV dye for the purpose of leak detection. It is appreciated that the device 10 is not limited to charging refrigerant using the low side of the a/c system, and that as an alternative, can be connected between the high side of the R/R/R machine and the high side of the a/c system with connection to the appropriate fittings or manifold connections.

While the above described embodiment provides a simple add on device 10 for an existing R/R/R machine 30, the device 10 can also be permanently connected to and or provided as a component of an R/R/R machine. For example, the hose 48 as shown in FIG. 3 could represent a permanent tubing or pipe connection with the device 10, the device 10 thus forming part of the R/R/R machine 30. Another option includes modifying the manifold 32 to include the device 10.

The above description is not intended to limit the invention to such disclosure, it being understood that changes and modifications may be incorporated within the scope of the appended claims.

What is claimed is:

1. In a refrigerant recharging system for adding refrigerant to an air conditioning system, a device for charging virgin refrigerant into the air conditioning system without exposing the virgin refrigerant to a process of the recharging system that is capable of removing certain additives in the virgin refrigerant, said device comprising:

a main valve having a first inlet for receiving the virgin refrigerant from a source of virgin refrigerant, a second inlet for connection to the recovery system and for receiving refrigerant therefrom, and an outlet for connection to the air conditioning system to deliver refrigerant thereto, said main valve being operable to provide at least two flow paths that are exclusive of each other, a first flow path from said first inlet to said outlet, and a second flow path from said second inlet to said outlet; and a second valve connected to said first inlet, said second valve configured for connection to said source of virgin refrigerant and being operable between open and closed positions for controlling the flow of fluid from said source of virgin refrigerant through said second valve to said main valve.

2. A device for charging refrigerant into an air conditioning system in accordance with claim 1 wherein said second valve comprises a refrigerant can charging valve.

3. A device for charging refrigerant into an air conditioning system in accordance with claim 2 wherein said second valve is connected directly to said main valve.

4. A device for charging refrigerant into an air conditioning system in accordance with claim 1 further comprising an extension hose through which said outlet of said main valve can connect to the air conditioning system, said hose having one end connected to said outlet.

5. A device for charging refrigerant into an air conditioning system in accordance with claim 2 wherein said can charging valve comprises a standard R-134a can charging valve having a ½" acme thread.

6. A device for charging refrigerant into an air conditioning system in accordance with claim 2 wherein said outlet comprises a ½" acme male thread fitting.

7. A device for use with a refrigerant recovery/recycle/recharging system for charging virgin refrigerant into an air conditioning system without exposing the virgin refrigerant to a process of the recharging system that is capable of removing an additive in the virgin refrigerant, said device comprising:

a main valve having a first inlet for receiving the virgin refrigerant from a source of virgin refrigerant, a second inlet for connection to the recovery system and for receiving refrigerant therefrom, and an outlet for connection to the air conditioning system to deliver refrigerant thereto, said main valve being operable to provide at least two flow paths that are exclusive of each other, a first flow path from said first inlet to said outlet, and a second flow path from said second inlet to said outlet;

a second valve connected to said first inlet, said second valve configured for connection to said source of virgin refrigerant and being operable between open and closed positions for controlling the flow of fluid from said source of virgin refrigerant through said second valve to said main valve; and an extension hose connected to said outlet through which said main valve is capable of connecting to the air conditioning system for delivering refrigerant thereto.

8. A device for charging refrigerant into an air conditioning system in accordance with claim 7 wherein said second valve comprises a refrigerant can charging valve.

9. A device for charging refrigerant into an air conditioning system in accordance with claim 8 wherein said second valve comprises a refrigerant can charging valve, and said outlet comprises a R-134a male thread fitting.

10. A device for charging refrigerant into an air conditioning system in accordance with claim 7 wherein said second inlet comprises a quick connect fitting.

11. In a refrigerant recharging system for adding refrigerant to an air conditioning system, wherein the refrigerant recharging system comprises means for removing and purifying refrigerant from the air conditioning system, a storage recovery tank for storing the removed refrigerant, and a manifold for connection to the air conditioning system, a device for charging virgin refrigerant into the air conditioning system without exposing the virgin refrigerant to the means for purifying the refrigerant of the recharging system and comprising:

a main valve having a first inlet for receiving the virgin refrigerant from a source of virgin refrigerant, a second inlet connected to the refrigerant recharging system for receiving refrigerant therefrom, and an outlet for connection to the air conditioning system to deliver refrigerant thereto, said main valve being operable to provide at least two flow paths that are exclusive of each other, a first flow path from said first inlet to said outlet, and a second flow path from said second inlet to said outlet; and a second valve connected to said first inlet, said second valve configured for connection to said source of virgin refrigerant and being operable between open and closed positions for controlling the flow of fluid from said source of virgin refrigerant through said second valve to said main valve.

12. The device of claim 11 further comprising a hose connecting said second inlet to the refrigerant recharging system.

13. The device of claim 12 further comprising an extension hose connected to said outlet through which said main valve is capable of connecting to the air conditioning system for delivering refrigerant thereto.

14. The device of claim 13 wherein said second valve comprises a refrigerant can charging valve.

15. The device of claim 13 wherein said extension hose is connected to the manifold of said refrigerant recharging system.

16. The device of claim 11 wherein said second valve is non-integral with said main valve.

17. The device of claim 16 wherein said second valve is connected to with said main valve with a fitting.

18. The device of claim 11 wherein said second valve is integrally connected to said main valve.

* * * * *